United States Patent [19]
El-Sherbini

[11] Patent Number: 4,879,753
[45] Date of Patent: Nov. 7, 1989

[54] THRESHOLDING ALGORITHM SELECTION APPARATUS

[75] Inventor: Ahmed M. El-Sherbini, Giza, Egypt

[73] Assignee: Wang Laboratories, Inc., Lowell, Mass.

[21] Appl. No.: 246,940

[22] Filed: Sep. 16, 1988

Related U.S. Application Data

[63] Continuation of Ser. No. 846,376, Mar. 31, 1986.

[51] Int. Cl.$^4$ .............................................. G06K 9/00
[52] U.S. Cl. .................................. 382/50; 358/261.1; 358/456; 382/9
[58] Field of Search .................. 382/9, 50, 56, 62, 63; 358/261, 283

[56] References Cited

U.S. PATENT DOCUMENTS

| | | | |
|---|---|---|---|
| 3,805,237 | 4/1974 | Cobb et al. | 382/9 |
| 3,840,698 | 10/1974 | Hinoshita et al. | 178/6.8 |
| 4,115,815 | 9/1978 | Nakagome et al. | 358/260 |
| 4,251,837 | 2/1981 | Janeway, III | 358/283 |
| 4,441,208 | 4/1984 | Iida | 382/56 |
| 4,447,830 | 5/1984 | Stoffel | 358/283 |
| 4,475,234 | 10/1984 | Nishijima et al. | 382/50 |
| 4,504,972 | 3/1985 | Scherl et al. | 382/9 |
| 4,517,606 | 5/1985 | Yokomizo et al. | 382/50 |
| 4,547,811 | 10/1985 | Ochi et al. | 382/9 |
| 4,549,220 | 10/1985 | Suzuki | 358/283 |
| 4,554,593 | 11/1985 | Fox et al. | 382/50 |
| 4,568,983 | 2/1986 | Bobick | 358/260 |

FOREIGN PATENT DOCUMENTS 2139447 11/1984 United Kingdom.

OTHER PUBLICATIONS

Anastassiou et al., "Digital Halftoning of Images", IBM Journal, vol. 26, No. 6, Nov. 1982, pp. 687-691.

Primary Examiner—Leo H. Boudreau
Attorney, Agent, or Firm—Michael H. Shanahan; Scott K. Peterson

[57] ABSTRACT

A thresholding algorithm selection apparatus for the selecting the threshold algorithm to be applied to a specimen in a digital imaging process is disclosed. The specimen is preliminarily scanned and thresholded using a predetermined thresholding algorithm. The resulting preliminary digital image is divided into a number of cells or regions. Each cell is classified according to its optical characteristics; e.g. textual, photographic, etc. The cell classification is effected in the preferred embodiment by comparing the average white and black run-lengths of each cell to experimental average run-length values which are representative of the different types of specimens. The specimen is re-scanned and thresholded with an appropriate thresholding algorithm for each cell. Additionally, the digital imaging system may contain an optical character recognition means, in which case the cell characterization step is used to trigger the optical character recognition means in a textual region, while causing the optical character recognition means to ignore non-textual cells.

6 Claims, 4 Drawing Sheets

BAYER'S ORDERED DITHER ALGORITHM $$\begin{bmatrix} 0 & 32 & 8 & 40 & 2 & 34 & 10 & 42 \\ 48 & 16 & 56 & 24 & 50 & 18 & 58 & 26 \\ 12 & 44 & 4 & 36 & 14 & 46 & 6 & 38 \\ 60 & 28 & 52 & 20 & 62 & 30 & 54 & 22 \\ 3 & 35 & 11 & 43 & 1 & 33 & 9 & 41 \\ 51 & 19 & 59 & 27 & 49 & 17 & 57 & 25 \\ 15 & 47 & 7 & 39 & 13 & 45 & 5 & 37 \\ 63 & 31 & 55 & 23 & 61 & 29 & 53 & 21 \end{bmatrix}$$

THRESHOLDING ALGORITHM SELECTION APPARATUS

This is a continuation of co-pending application Ser. No. 846,376, filed on Mar. 31, 1986.

BACKGROUND OF THE INVENTION

This invention relates generally to digital electronic imaging systems. More specifically, the present invention relates to an apparatus and method for efficiently choosing a thresholding algorithm to be applied to regions of an image represented by optical reflectivity or transmissivity signals at each image element (pixel).

In the typical digital imaging system a specimen (or document) is illuminated and then scanned at every pixel to obtain analog reflectivity values. The analog reflectivity values are converted to a multi-digital number by an analog-to-digital converter, where the multi-digital number ranges from a minimum value representing the darkest state possible for the pixel, decimal number 0 for example, to a maximum value representing the lightest state possible for the pixel, decimal number 63 for example.

The multi-digit number representing the reflectivity of the pixel is compared to a threshold value (sometimes dynamic), so that the final digitized picture is represented by a single binary digit for each pixel. Stated differently, each pixel in the final digitized picture is stored or displayed in either an "ON" state or an "OFF" state. In comparing the multi-digit number to the threshold value the resulting pixel value is obtained as follows: if the multi-digit value exceeds the threshold value the pixel is determined to be in the "ON" state; if the multi-digit value equals or is less that the threshold value the pixel is determined to be in the "OFF" state.

It has been observed that the optical characteristics of digital images vary with predictability depending on the type of specimen. For example, photographic (or grey scale) specimens noticeably differ from text or graphic specimens in the their pixel patterns. Also, it has been observed that some thresholding methods operate more efficiently in digitizing one type of specimen, while being less efficient in digitizing another type of specimen. For example, a particular threshold method might provide a very accurate representation of a text specimen, while providing a poor representation of a photo specimen.

SUMMARY OF THE INVENTION

Accordingly, it is a principal object of this invention is to provide a more efficient means for digitizing specimens.

Another object of this invention is to provide a means for selecting an efficient thresholding method for a specimen, depending on the nature of the specimen.

Yet another object of this invention is to provide a means for selecting an efficient thresholding method for each of specified regions in a specimen, depending on the nature of the regions.

A further object of this invention is to accomplish the above-mentioned objects without user intervention.

Additionally, it is an object of this invention to aid an optical character recognition means by triggering the optical character recognition means only in regions of the specimen determined to be textual in nature.

The foregoing and other objects of the present invention are realized by first preliminarily thresholding the multi-digit values representing the optical densities of the specimen pixels to obtain a two-tone (one digit per pixel) representation of the specimen. The image is then divided into a number of cells of pixels, e.g., 32 by 32, and average white run lengths as well as average black run lengths are measured. A "run" is a group of identical binary values on a scan line. A "run-length" is the length or number of pixels encompassed by the run. The average white run length of a cell is then the average value of the white pixel runs. Likewise, the average black run length of a cell is the average value of black pixel runs.

The average run-lengths of each cell are compared to experimental run-length values to determine if the cell is primarily textual, photographic, graphic, etc. An appropriate thresholding method is then chosen for each cell. The specimen is re-scanned and digitized using the appropriate thresholding methods for each cell. Further steps in the process may include storage in a bit map memory, compression of the image to reduces memory space requirements, and final storage.

DESCRIPTION OF THE DRAWINGS

The foregoing and other objects and features of the present invention are apparent from the specification, the drawings and the two taken together. The drawings are.

Table 1 is a compilation of sample experimental run-length data for five textual specimens.

Table 2 is a compilation of sample experimental run-length data for five photographic specimens.

DETAILED DESCRIPTION

Figure 1:
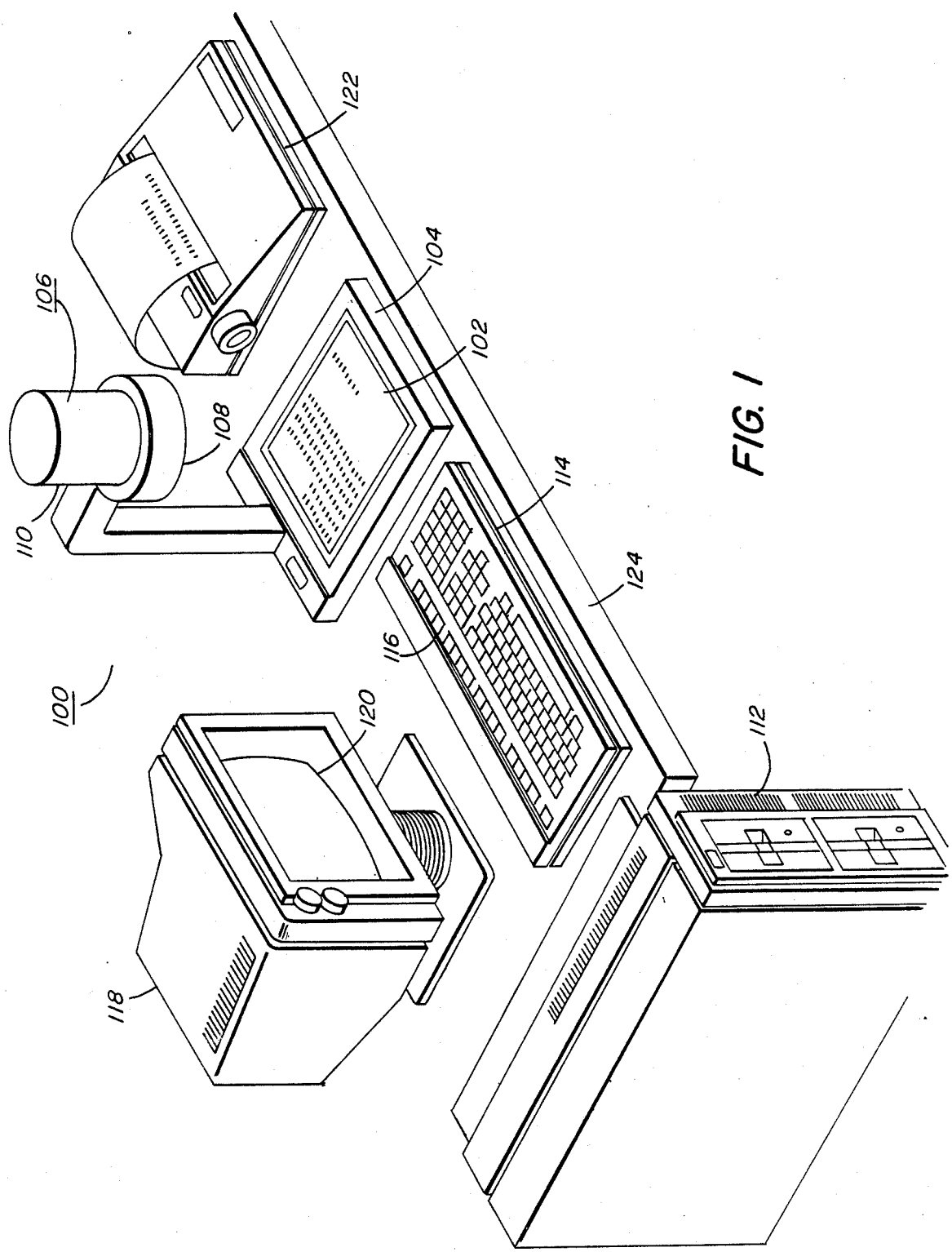
FIG. 1 is an isometric drawing of an example of a digital imaging system such as may be used in conjunction with the present invention.

FIG. 1 shows a digital imaging system 100 used to create digital images of a document 102 on a document mount 104. The illustrated system is the PIC system of Wang Laboratories, Inc., the present assignee of the invention herein. The document or specimen 102 may be a picture, chart, graph, text page or other image.

The specimen 102 is scanned on a line-by-line basis by a scanner or signal providing means 106 above the document. The primary components of the scanner 106 are a lamp or specimen illuminator 108, and a camera 110.

The specimen illuminator 108 illuminates the specimen 102 by causing light to be projected onto the specimen 102 in such a manner that the projected light is reflected from the specimen 102. Opaque documents 102 reflect the scanner light from their surfaces, while translucent or transparent documents 102 reflect the light with the aid of the specimen mount 104.

The reflected light from the specimen 102 is captured by the camera 110. A charge-coupled device (CCD) having a linear array of photoresponsive cells as is well known in the prior art, is included in the camera 110 to produce analog signals at each pixel location within a two-dimensional array of pixels which are proportionate to the pixel reflectivity. The CCD array within the camera 110 is mechanically displaced orthogonally to its linear array to effect a full two dimensional scan of the specimen 102. The camera 110 contains circuitry for effecting a conversion of the analog signals to multi-digital numbers representing the reflectivity of each pixel of the document 102. The camera 110 can be a high speed, full frame TV camera, such as is commercially available.

Alternate embodiments for the scanning process are possible. For example, the specimen 102 may be transparent, such as microfiche, and the specimen illuminator 108 might, instead of causing most of the light to be reflected from the specimen 102, shine light through the specimen 102. The camera 110 would be located strategically to capture the transmitted light, and the signals received from the camera 110 would be a measure of the transmissivity of the specimen 102 rather than the reflectivity.

At the heart of the system 100 is the computer console 112. In the present embodiment the console 112 contains the central processing unit (CPU), memory to store the digital images and other data, as well as program instructions to direct the operation of the separate components of the digital imaging system 100.

The user initiates and ultimately controls the operation of the digital imaging system 100 from the keyboard 114. Special function keys 116 are provided for sending special instructions to the system 100 during the digital imaging process.

A monitor 118 is included in the system 100. The monitor 118 contains components, including a screen or cathode ray tube (CRT), necessary to display images from the specimens 102 either directly from the output of the digitizing process or from other memory after the digitizing process has taken place and been stored.

Figures 2, 4:
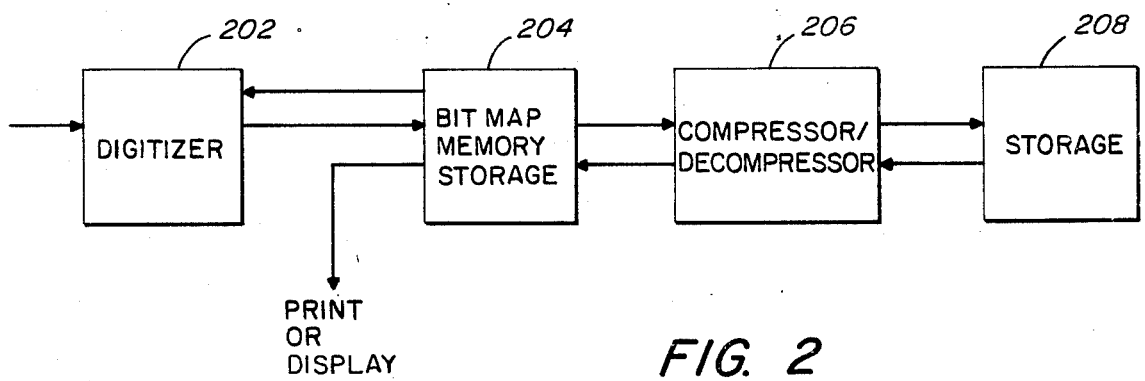
FIG. 2 is a schematic diagram of the digital imaging apparatus encompassing the present invention.
FIG. 4 is an example of a dithering matrix used in the process of dithering an image.

Turning now to FIG. 2, a flow analysis of the digital imaging process of the present invention will be discussed. Each of the components shown in FIG. 2 involve multiple elements of the digital imaging system 100 which work in combination to produce the labeled function.

The analog pixel signals generated by the CCD array in the camera 110 are converted to an eight bit digital number in the camera. The digitizer or digitizing means 202 processes a serial stream of eight bit or one byte signals representative of a pixel value according to the present invention, and creates a one bit representation from the eight bit value. It is the component of the present invention for which most of the description will be given.

The one bit pixel values representing the digital image is sent from the digitizer 202 to bit map memory storage 204 for intermediate storage. Since even a single bit per pixel digital image tends to consume large amounts of memory, the present system 100 includes a compressor/decompressor 206 for compressing the image in the bit map memory storage 204. The effect of compression is to reduce the number of binary bits required to represent the digital image. Various compression methods appear in the prior art, and will thus not be discussed here. The compressed image or data is finally sent from the compressor/decompressor 206 to storage or final memory 208, e.g., a disk storage device.

With the image stored in final memory 208, the user can at any time cause the system 100 to retrieve, edit and display the image on the screen 120, by issuing commands to system 100 using the keyboard 114.

Figure 3:
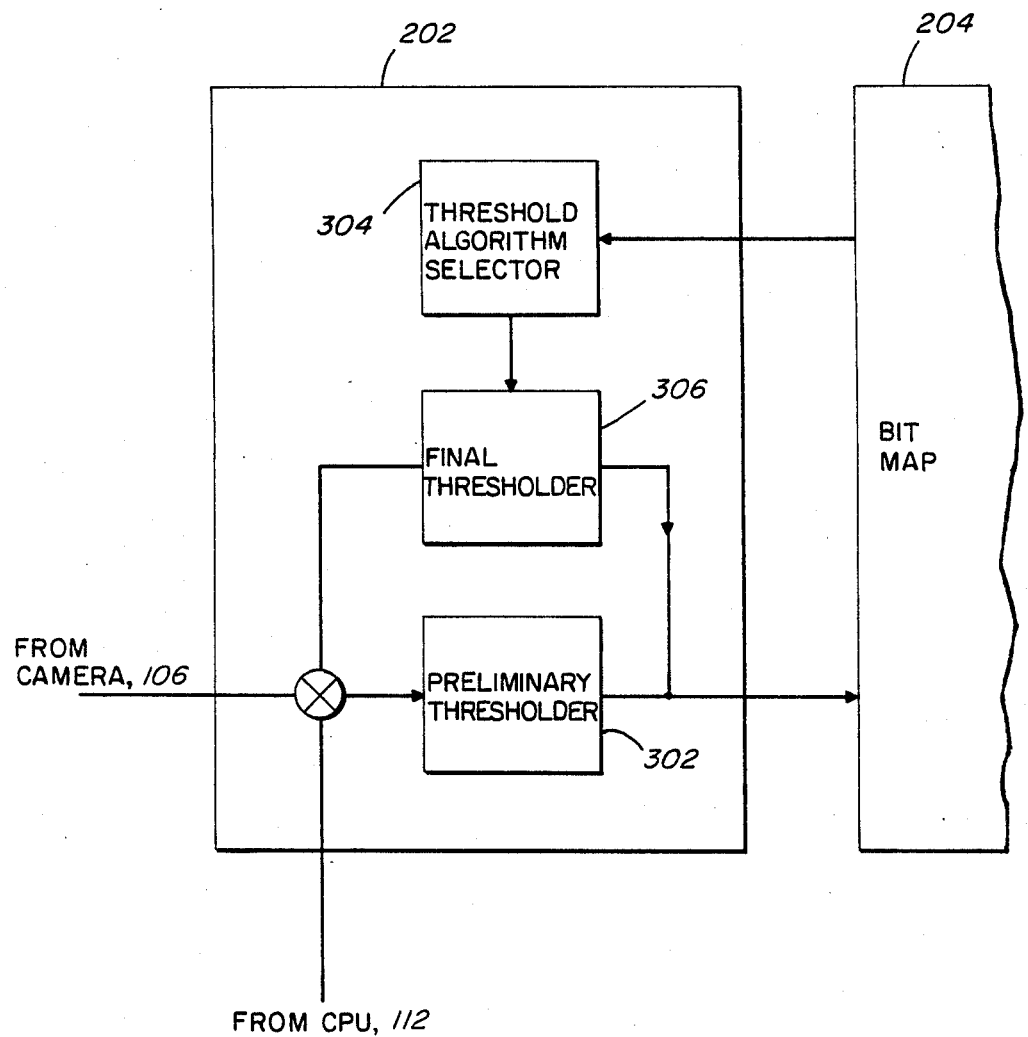
FIG. 3 is a more detailed version of the component entitled "digitizer" in FIG. 2.

FIG. 3 shows the preferred embodiment of the digitizer 202. The digitizer 202 is comprised of a preliminary thresholder 302, a threshold algorithm selector 304, and a final thresholder 306.

The preliminary thresholder 302 thresholds the specimen 102 during an initial scan of the specimen 102. Roughly speaking, the preliminary thresholder 302 follows the same steps for digitization described supra. That is, the specimen 102 is scanned by the scanner 106. The analog signals produced by a reflection of specimen illuminator light 108 from the specimen 102 are converted to multi-digit binary numbers representing the pixel reflectivities. The multi-digit pixel reflectivity values are thresholded in a manner well known in the prior art.

Many different thresholding schemes can be employed at this juncture including the following simple algorithm:

(A) $TH = CWp_{max}$ where TH is the threshold value, C is a constant—perhaps 0.75, and $Wp_{max}$ is the maximum white peak value observed, which is updated during the scanning process. The threshold value TH is updated at each new pixel. Additionally, each pixel is thresholded using the current value of TH while it is being scanned. After the initial thresholding of the specimen by the preliminary thresholder 302 the digital image is stored in the bit map memory storage 204 to await operation of the threshold algorithm selector 304. The purpose of the preliminary thresholder 302 is to provide a working image available for use by the threshold algorithm selector 304. Hence the simple algorithm of equation A rather than a more complex one suffices for the preliminary thresholding process.

A grey scale image is an image having a high number of regions where the optical density is neither that of white or black. In other words many grey regions are present. Grey scale images are in stark contrast to textual images, such as this page. Generally speaking, in textual images the areas are either black (inside of the black ink comprising characters) or white (the part of the page where no characters appear.

A textual specimen can be thresholded using, for example, the following equation:

(B) $TH_f = C_f(Wp_{i-1} + Wp_i + Wp_{i+1})$ where $TH_f$ represents the final threshold value to be used during the final thresholding process by the digitizer 202, $C_f$ is a constant, $Wp_{i-1}$ is the white peak value of the previous pixel in the scan line, $Wp_i$ is the white peak value at the current pixel being thresholded in the scan line, and $Wp_{i+1}$ is the white peak value of the pixel immediately following the current pixel.

The thresholding algorithm in equation B works fine for textual type specimens but is inefficient for photo type specimens. An application of the algorithm in equation B to a photograph results in a poor transfer of the image to its digital state, including a number of erroneous pixel state (ON/OFF) decisions.

A dithering technique is suited for thresholding a grey scale image. Dithering is an image processing technique which improves a two level digital image's ability to create the illusion of a grey scale picture by appropriately controlling the spatial density of light and dark pixels. One form of dithering is accomplished by applying a dither algorithm to the eight bit pixel values generated by camera 110. The dither algorithm is analogous to a photographic screen and consists of a pattern of threshold values in the form of a matrix, varying from the darkest to the brightest pixel values over the entire range of values, e.g., 0 to 63 for a six bit number, or 0 to 255 for an eight bit number. The brightness of each pixel is compared with the elements in the dither matrix, and thresholded accordingly, thus reducing the specimen to a group of single digit binary numbers.

One sample of a dithering matrix is shown in FIG. 4. The matrix contains a pattern of threshold values through which all the pixel elements representative of a document 102 are processed. The values in the first or top horizontal row of the matrix are cyclically applied to the first row or scan line of pixels across the width of the digital image. The values in the second through eight rows are likewise cyclically applied to the pixels of the next seven rows. The entire process is repeated for the ninth through the sixteenth line and so forth until the entire image is dithered/digitized. Dithering works well for grey scale specimens, but is inappropriate for text specimens.

It is desirous to efficiently digitize a group of varying documents 102 without user intervention. It is also desirable to efficiently digitize documents which contain both text and graphic images without user intervention. The present invention solves this problem by selecting a different algorithm depending on the nature of the area to be digitized. For example, the threshold algorithm selector 304 may choose between the threshold formula of B and the dither matrix of FIG. 4, depending on the region currently being thresholded.

Figure 5:
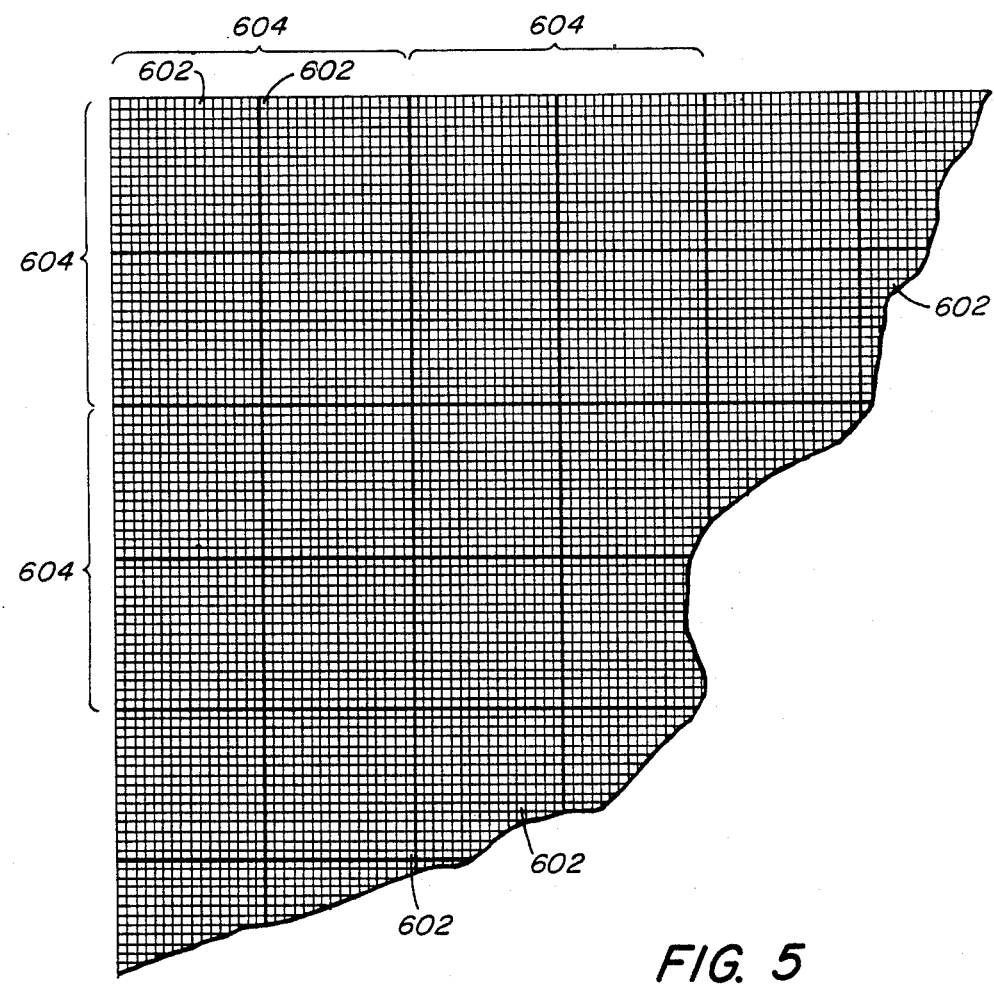
FIG. 5 is a close-up of the test cells comprised of pixels in a region of a digitized image.

Turning now to FIG. 5, the pixels 602 of the digital image, representative of an image of document 102 and stored in the bit map storage 204, are grouped into a number of cells 604. For example, the cell size may be 32 by 32 pixels.

Tables 1 and 2 show experimental data compiled during an observation of different types of digitized specimens stored in bit map memory 204 following the processing of the input pixels by the preliminary thresholder 302.

TABLE 1

Statistical Values of the 5 "Text Documents"

| Document | Average White Run Length | Average Black Run Length |
|---|---|---|
| References | 141.450 | 5.903 |
| Memo 1 | 110.214 | 5.359 |
| Memo 2 | 149.616 | 4.724 |
| Tech Paper | 61.406 | 4.819 |
| Release | 101.618 | 5.512 |

TABLE 2

Statistical Values of the 5 "Photographic Documents"

| Document | Average White Run Length | Average Black Run Length |
|---|---|---|
| Horse | 17.667 | 27.463 |
| T-Square | 87.370 | 14.981 |
| Dancer | 46.22 | 157.407 |
| Computer | 21.221 | 20.025 |
| Machine | 71.705 | 49.025 |

The average black pixel run lengths, ABRL, as well as the average white pixel run lengths, AWRL, are compiled for the different test specimens. It can be readily seen that the five "text" specimens referred to in Table 1 contain very low average black run lengths and very high average white run lengths. On the other hand, the five "photo" or "picture" specimens referred to in Table 2 yield average black and white run lengths that were much closer to parity than in the case of the text specimens.

In the present invention, the average black and white run lengths, ABRL and AWRL respectively, of each cell 604 are computed. Various averaging methods can be used, including simple and weighted methods. For example, it is observed from Table 1 that none of the average black run-lengths of the text documents exceeds 6 pixels. This suggests that text type documents can be characterized by average black run lengths which are less than 6 pixels. Using 6 as the reference average black run length, the actual average black run length of each cell 604 is compared to 6. If the actual value is less than 6 the cell is deemed to be primarily textual in nature. If the actual value is greater than or equal to 6 the cell is deemed to be primarily photographic, that is, a continuous tone image.

The appropriate thresholding algorithm is selected for each cell 604 by the threshold algorithm selector 304. The reference value used by the selector means 304 for average black run lengths is chosen to be higher than 6, e.g., 9 or 10, a number midway between the lowest ABRL in Table 2 and the highest ABRL number in Table 1.

Returning to FIG. 3, the specimen 102 is re-scanned and is processed by the final thresholder 306, which applies the text threshold equation B or Bayer's Ordered Dither algorithm of FIG. 4 to each cell 604, according the cell classification made by selector 304 on the digital image generated during the first scan. A non-uniformly classified specimen applies different threshold algorithms during the final scan of the document 102. The finally thresholded specimen 102, now efficiently digitized, is sent to the bit map memory storage 204.

In an enhanced embodiment, the above-described components of the present invention are used with a character recognition software program to further convert or compress the digital images into a series of codes where printed characters appear in the specimen 102. In order to efficiently use the character recognition program, the cell characterizing means of the threshold algorithm selector 304 enables the character recognition program when text cells have been identified, and disables the character recognition program when non-textual cells have been identified.

Various modifications and variations of the foregoing described invention are obvious to those skilled in the art. Such modifications and variations are intended to be within the scope of the present invention. The embodiments described are representative of a multitude of variations without changing the essence of the invention's operation. For example, the entire specimen 102 can be given a single classification, such as "text" or "photo", without dividing its digital image into cells 604. In this case, one thresholding algorithm is selected by the thresholding algorithm selector 304 for the entire specimen 102, and applied to the entire specimen 102 by the final thresholder 306.

Additionally, the thresholding algorithm employed by the preliminary thresholder 302 need not be that of equation B. Many other thresholding algorithms would suffice. Likewise, the thresholding algorithms selected by the threshold algorithm selector 304 are not limited to those in equation B and FIG. 4. Alternative thresholding algorithms for separate thresholding of text and photo specimens or areas can be used.

Also, the specimen or cell classes may be more than two (i.e., text and photo), and a different thresholding algorithm may be applied for each class of images. The reference average run lengths to be compared to the actual average run lengths may differ from those stated above.

I claim:

1. An image digitizer comprising:
   (A) a preliminary thresholder for receiving signals representing the optical intensity of pixels of an image and producing a preliminary binary bitmap representation of the image suitable for discrimination between text and grey scale image;
   (B) a text thresholder for receiving signals representing the optical intensity of pixels of the image to be digitized and producing a binary bitmap representation of the imge according to a text thresholding algorithm;
   (C) a grey scale imge thresholder for receiving signals representing the optical intensity of pixels of the image and producing a binary bitmap representation of the image according to a grey scale image thresholding algorithm; and
   (D) thresholder selection means
      (a) for computing from the preliminary binary bitmap an average run length for each of a plurality of regions of the image,
      (b) for comparing the computed average run length of each region with a predetermined run length threshold to categorize each region as either a text type or a grey scale type image,
      (c) for causing the text thresholder to be applied to regions of the image determined to be of the text type, and
      (d) for causing the grey scale image thresholder to be applied to regions of the image determined to be of the grey scale type.

2. The image digitizer of claim 1 wherein the average run length computed is that of black pixels, and wherein a region is categorized as text type if the computed average run length is less than the run length threshold and a region is categorized as grey scale type if the computed average run length is greater than the run length threshold.

3. The image digitizer of claim 2 wherein the preliminry thresholder compares the optical intensity of image pixels to an intensity threshold equal to a constant times a maximum white peak value that has been observed by the digitizer.

4. The image digitizer of claim 3 wherein the regions are 32 by 32 pixels in size, and wherein the run length threshold is about 10.

5. The image digitizer of claim 1 wherein the average run length computed is that of white pixels, and wherein a region is categorized as text type if the computed average run length is greater than the run length threshold and a region is categorized as grey scale type if the computed average run length is less than the run length threshold.

6. The image digitizer of claim 5 wherein the preliminary thresholder compares the optical intensity of image pixels to an intensity threshold equal to a constant times a maximum white peak value that has been observed by the digitizer.

* * * * *